United States Patent Office 3,463,947
Patented Aug. 26, 1969

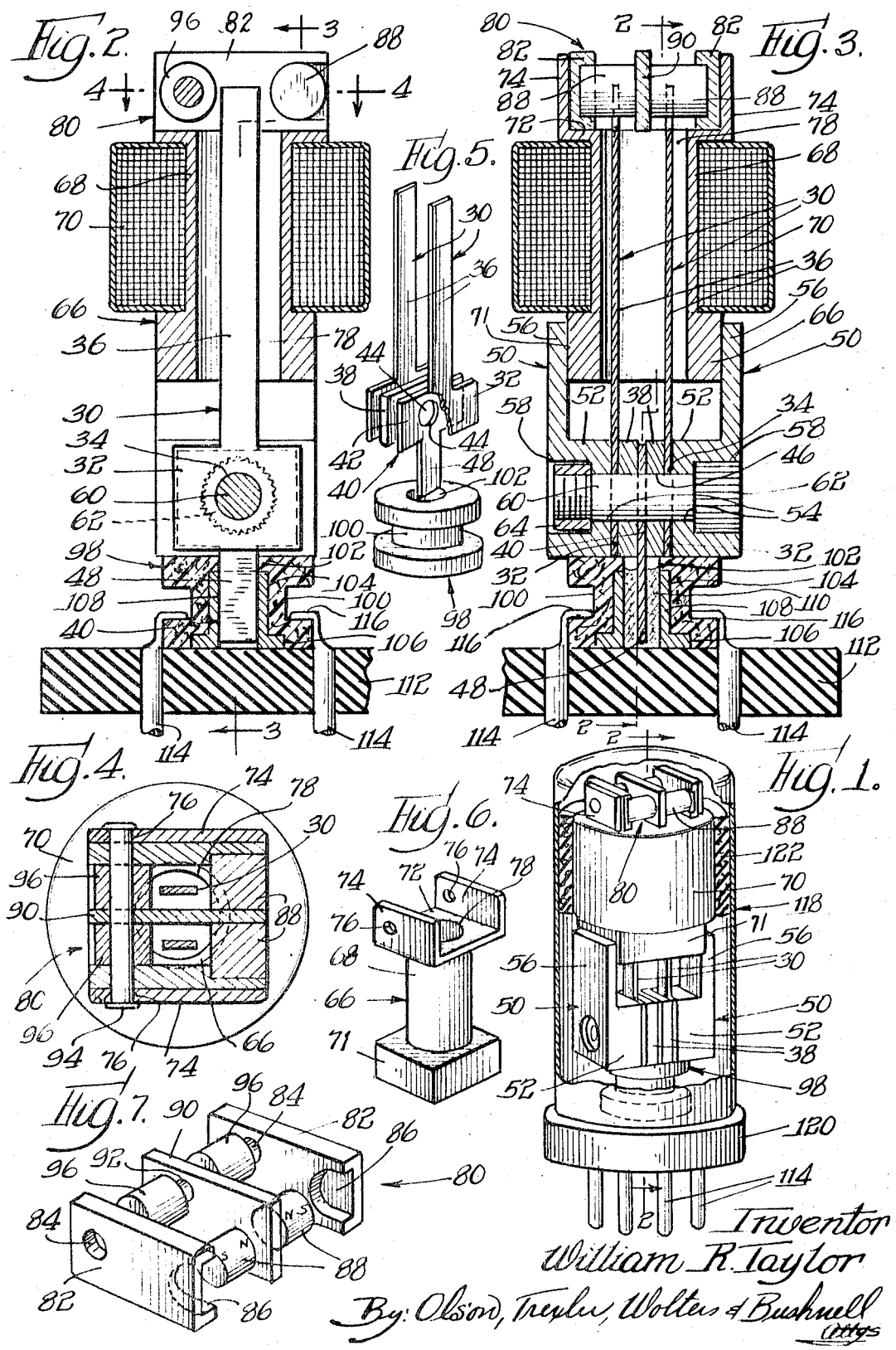

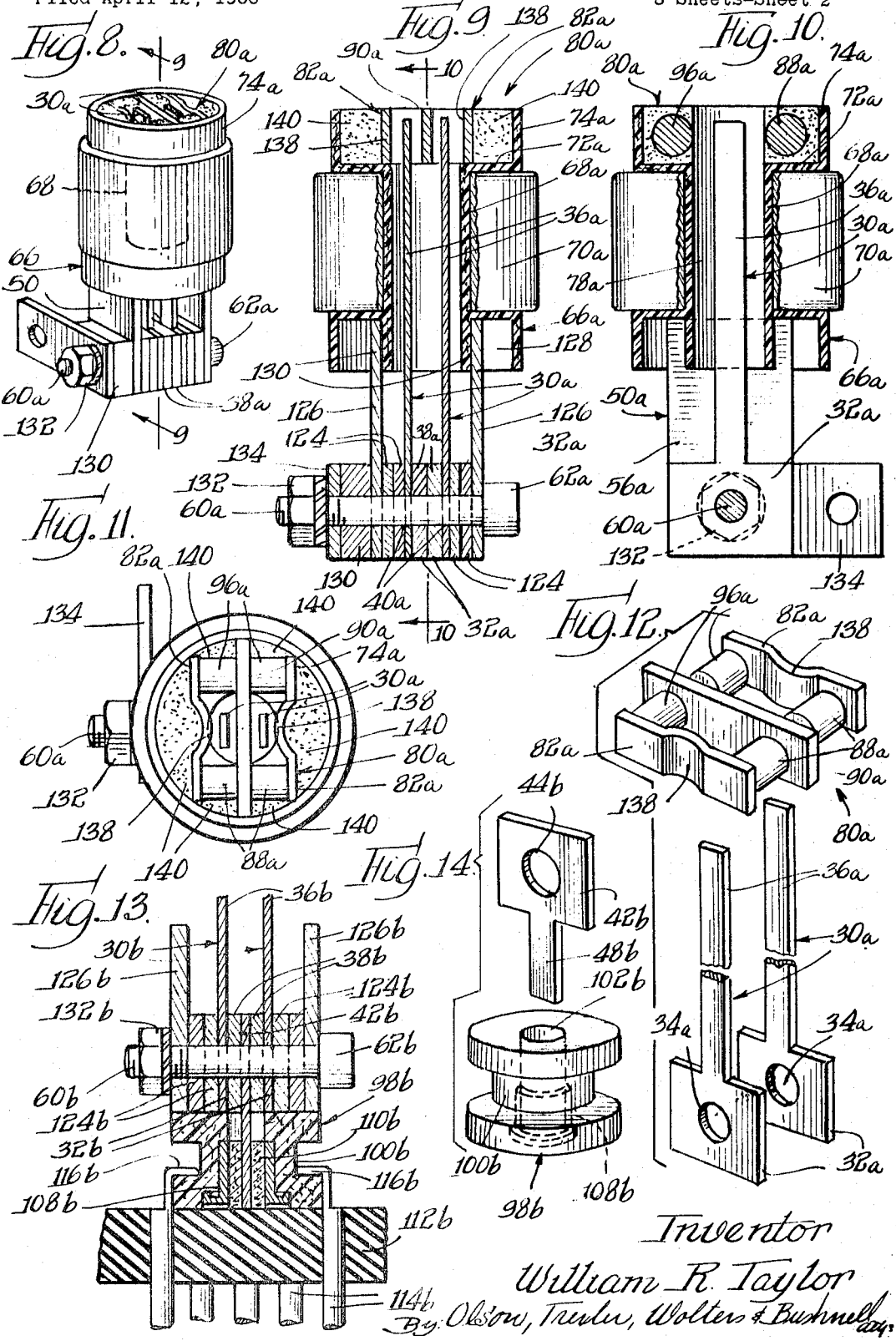

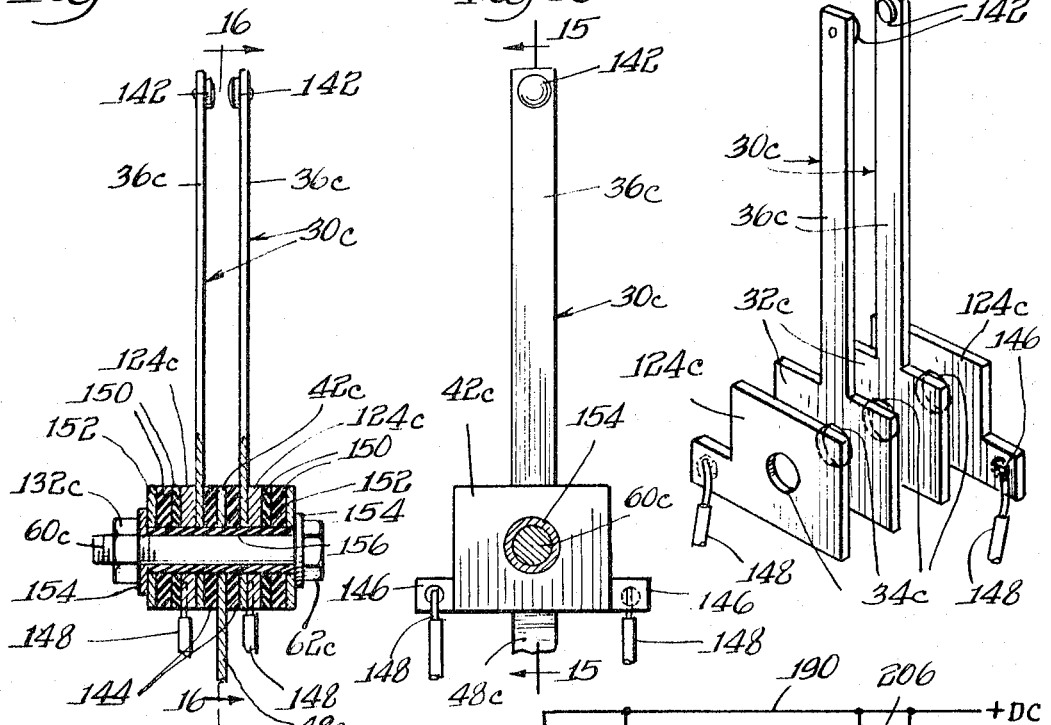

3,463,947
RESONANT REED DEVICE
William R. Taylor, Buffalo, N.Y., assignor to Perry Laboratories, Inc., Buffalo, N.Y., a corporation of New York
Filed Apr. 12, 1966, Ser. No. 542,145
Int. Cl. H02k 35/06
U.S. Cl. 310—25                 10 Claims

ABSTRACT OF THE DISCLOSURE

A resonant reed device having a permanent magnet structure cooperable with one or two vibrating reeds. The permanent magnet structure comprises three magnetically susceptible members held in spaced-apart relation by a pair of spacers at one end of the members, and by a pair of small permanent magnets at the opposite end, the two permanent magnets having like poles confronting one another, whereby the center of the three members becomes a pole of one polarity, and the two outer members become poles of opposite polarity. In a circuit utilizing the particular resonant reed device, input and output coils comprise a part of a bridge which is unbalanced at the resonant frequency of the reeds. The reeds are electrically isolated from the bridge circuit.

---

This invention relates to a resonant reed device.

Resonant reed devices are known in which one or more reeds are arranged in an alternating electromagnetic field to respond when the alternating field coincides or substantially coincides with the natural period of vibration of the reed or reeds. Such resonant reed devices frequently incorporate a pair of contacts which are brought into engagement upon vibration of the reeds. The contacts are used to provide an output signal, usually D.C., when the correct alternating current input signal is applied. Obviously, the contacts present certain disadvantages, and it has in some instances been found preferable to provide a reed device with no contacts. The input impedance of the reed device has a sharp discontinuity at the frequency of reed vibration, and this impedance discontinuity can be used for triggering a subsequent circuit.

It is the primary object of this invention to provide an improved resonant reed device of simple and rugged construction. It is further an object of this invention to provide a resonant reed device which with only minor modification can be used either as a contactless device or as a relay with contacts.

Another object of the present invention is to provide a resonant reed device which, with only minor modification, can be marketed as a free-standing device or as an enclosed or encapsulated device.

A still further object of the present invention is to provide a contactless resonant reed device in improved and novel relay circuits.

Other and further objects and advantages of the present invention will be apparent from the following description when taken in connection with the accompanying drawings wherein:

FIG. 1 is a perspective view of a resonant reed device constructed in accordance with the principles of the present invention, part of the case being broken away for clarity of illustration;

FIG. 2 is a vertical sectional view on an enlarged scale taken substantially along the line 2—2 in FIG. 1, the case being removed completely;

FIG. 3 is a vertical sectional view taken at right angles to the view of FIG. 2, and specifically along the line 3—3 in FIG. 2;

FIG. 4 is a horizontal sectional view taken substantially along the line 4—4 in FIG. 2;

FIG. 5 is a perspective view on a smaller scale showing certain of the operating parts of the reed device;

FIG. 6 is a perspective view showing the spool on which the coil is wound and on which certain of the parts are mounted;

FIG. 7 is an enlarged perspective view showing the magnetic structure for the reed device;

FIG. 8 is a perspective view somewhat similar to FIG. 1 showing a preferred embodiment of the present invention in a free-standing or non-cased configuration;

FIG. 9 is a vertical sectional view on an enlarged scale taken substantially along the line 9—9 in FIG. 8;

FIG. 10 is another vertical sectional view taken at right angles to FIG. 9 and generally along the line 10—10;

FIG. 11 is a top or plan view of the device in FIGS. 8–10;

FIG. 12 is an exploded perspective view of certain of the operating parts of the present embodiment of the invention;

FIG. 13 is an enlarged vertical sectional view generally similar to FIG. 9 but showing a modification thereof with enclosure of the reed device in a case;

FIG. 14 is an exploded perspective view of part of the bottom structure of FIG. 13;

FIG. 15 is a partial vertical sectional view showing a modification of the invention utilizing contacts on the reeds and taken substantially along the line 15—15 in FIG. 16;

FIG. 16 is a vertical view partly in section taken substantially along the line 16—16 in FIG. 15;

FIG. 17 is a fragmentary exploded perspective view of the device of FIGS. 15 and 16;

FIG. 18 is an electrical wiring diagram showing a preferred circuit incorporating the contactless resonant reed device of any of FIGS. 1–14; and FIG. 19 is a modification of a part of the electric circuit.

Reference now should be had to the figures in greater particularity, and first to FIGS. 1–7, wherein there will be seen a pair of steel reeds 30 in face-to-face, spaced parallel relation. Each of the reeds has a rectangular base 32 with an aperture 34 therethrough, and an elongated upstanding tongue 36.

The reed bases are spaced apart by steel shims 38, and also by a mounting pin or tailpiece 40 therebetween. The mounting pin or tailpiece 40 comprises an upper rectangular section 42 coextensive in outline with the shims 38 and reed bases 32 and provided with an aperture 44 alined with the apertures 34 in the reeds and similar apertures 46 in the shims. The mounting pin or tailpiece further includes a depending tongue section 48 for mounting in a manner hereinafter to be described. Conveniently, the mounting pin or tailpiece comprised a reed with a part of a tongue clipped off, and mounted in inverted position relative to the reeds.

A pair of mounting bases 50 conveniently made of brass is clamped against the outer faces of the reed bases. Each of the bases 50 includes a lower block portion 52 of the same size as the reed bases and shims and is provided with apertures or bores 54 aligned with the previously-mentioned apertures in the reed bases, shims, and mounting pin. Each mounting base 50 further includes an upstanding flange or wall 56.

The mounting base blocks 52 are counterbored at 58 concentric with the bares 54, and a steel bolt 60 is passed through the various alined apertures and has a serrated head 62 which bites into the brass surrounding the counterbore 58 of one of the mounting bases. A nut 64 is threaded on the other end of the bolt and is received in the counterbore of the other mounting base 50.

It will be apparent from the foregoing that the reeds 30 are rigidly clamped together at their bases whereby in vibration the two reeds react upon one another and do not transmit vibration to any substantial extent to the mounting base. It will be appreciated that reeds of different natural periods of vibration will differ markedly in size. Hence, it is contemplated that shims 38 of different thicknesses would be used with different-sized reeds with other parts being scaled accordingly.

The resonant reed device further includes a bobbin and magnet support identified generally at 66, and seen most clearly in FIG. 6. The bobbin and magnet support comprises a central cylindrical section 68 on which is mounted a coilwinding 70. The bobbin and magnet support is made of brass, and includes an enlarged square base 71 which is clamped between the upstanding walls or flanges 56 of the mounting bases 50 as readily may be seen in FIGS. 1 and 3. In some instances it may be found desirable to use some security means to augment the clamping force, and any suitable or known means may be used, such as an epoxy cement. The bobbin and magnet support has at the top of the cylindrical section 68 a horizontal wall 72 with upstanding edge flanges 74 thereon, each having an aperture 76, the two apertures being alined. An axial bore 78 extends completely through the bobbin and magnet support from one end to the other thereof. The upstanding flanges 78 support a magnet structure 80 best seen in FIG. 7, but also seen in FIGS. 1-4.

The magnet structure 80 comprises a pair of outer poles or pole pieces 82 of rectangular outline and made of low-carbon cold rolled steel. The outer pole pieces fit against the inner faces of the flanges 74, and each pole piece is provided with an aperture 84 alined with the apertures 76. Toward one end of each pole piece there is an end opening recess 86 having a semi-circular inner margin. Small cylindrical magnets 88 fit in these recesses and extend toward one another to clamp a rectangular center pole piece 90 between them, this center pole piece also being made of low-carbon cold rolled steel. The center pole piece 90 is of the same rectangular size and configuration as the outer pole pieces, and it is provided with an aperature 92 alined with the apertures 84. A rivet 94 extends through the ange apertures 76, the outer pole piece apertures 84, brass cylindrical spacers 96, and the center pole piece 90, clamping all of the parts of the magnet structure together. This includes clamping of the cylindrical magnets 88, and it will be understood that each of these magnets has a north pole at one end and a south pole at the other end. Like poles are oriented toward one another and in contact with the center pole piece 90. In the illustrative example it is the north poles which confront the center pole piece 90. Thus, the center pole piece 90 becomes a north pole and the outer pole pieces 82 become south poles.

As will be seen particularly in FIGS. 2–4, the upper ends of the reeds 30 extend between the pole pieces 82 and 90 respectively. When the coil 70 is energized by an alternating current, the top ends of the reeds at one moment are north poles, being thereby repelled outwardly away from the center pole and attracted toward the outer poles. In the next half-cycle, the tops of the reeds become south poles and are attracted toward the center polt piece 90, being repelled by the outer pole pieces 82. If this alternation of current does not coincide with the natural frequencies of the reeds, then the reeds are not allowed to build up any appreciable amplitude of vibration. However, when the alternating current with which the coil 70 is energized is at the natural frequency of vibration of the two reeds, then the reeds will build up rapidly in amplitude to the maximum possible. This causes a marked change in the input impedance of the coil 70, and this change can be enlisted to exert a control function.

The resonant reed device further includes a mounting insulator 98, preferably made of fibrous material, one satisfactory material being known in the trade as "Grade XK Fibre." The mounting insulator is of cylindrical shape, having flat ends, and having a circumferential groove 100 therein. The insulator is provided with an axial bore 102 from end to end, and is counterbored from the bottom with a relatively small-diameter counterbore 104 and a relatively large-diameter counterbore 106 of shallower depth. A flanged brass bushing 108 complementary in shape to the counterbores 104 and 106 is inserted therein, and the depending tongue 48 of the tailpiece or mounting pin is inserted through the bore 102 into the eyelet where it is permanently secured in place by solder 110. The underside of the reed bases and shims fits snugly against the upper surface of the mounting insulator.

A conventional fibrous or other insulating disc 112 is provided with tubular depending pins 114 of conventional nature. The number of pins depends on the type of socket with which the device is to be associated, and for example in the illustrative embodiment there are seven such pins. The upstanding upper ends 116 of the pins are bent over at right angles into the circumferential groove 100 to clamp the insulating mounting base tightly against the top surface of the insulating disc 112.

The resonant reed device is completed by a cylindrical can 118 (FIG. 1) of conventional design, and for example made of nickel-finished brass. The can forms a case or housing for the remaining parts, and has an enlarged base portion 120 fitting tightly over the disc 112 with only the pins 114 protruding. A cylindrical ring 122 of silicone foam rubber encircles the coil winding 70, fitting snugly thereon and impinging against the inner surface of the can whereby to insure proper orientation of the can relative to the remainder of the reed device, and positively to prevent rattling around of parts inside the can.

A modification of the invention is shown in FIGS. 8–12, particularly a modification which has found commercial acceptance. The embodiment in FIGS. 8–12 is adapted for free-standing or un-cased use. Many of the parts are similar to or identical with those heretofore shown and described, and similar parts are identified by similar numerals with the addition of the suffix *a* to avoid duplication and prolixity of description.

The use of formed mounting bases 50 is avoided, since different sizes of reeds must be spaced differently, the size of the reeds obviously varying with the necessary natural frequency thereof. Since the spacing between the reeds varies, the distance between the upstanding walls or flanges 56 of the mounting bases must be constant, then the radial thickness of the bottom or base portions 52 thereof must vary. This is avoided in the embodiments of FIGS. 8–12 wherein in addition to the shims 38a between the reeds, there are shims 124 disposed on the outer faces of the reed bases 32a. The number and thickness of these shims may vary in accordance with the size and requisite spacing of the reeds, and the shims preferably are made of brass. On either end of the stack of brass shims is a yoke 126 of hard brass upstanding into the vicinity of the bobbin 66a, the latter being provided with a downwardly-facing circumferential recess or cavity 128 in which the upper ends of the yokes 126 are received, fitting tangentially against the downward extension 130 of the cylindrical section 68a. In addition to a certain clamping force exerted by the yokes, epoxy cement preferably is used to hold the bobbin to the yoke.

A bolt 60a passes through the yokes, reed bases, and various shims, and in the present illustrative embodiment is shown as having an enlarged head 62a, preferably with a hexagonal or the like axial recess for receipt of a complementary wrench. A rectangular nut 130 of the same outline, size and configuration as the reed bases and shims is threadedly received on the bolt and clamps the aforementioned parts together. In most instances the nut 130 is made of brass, but in some circumstances it is made of steel. A steel nut 132 of the type preferably preassembled with a toothed lock washer and known as a "Sems" assembly is threaded on the bolt and clamps against the brass nut 130 to take up axial strain on the bolt 60a.

As may be seen in FIGS. 9 and 11, the bolt outwardly of the nut 130 passes through a mounting plate, bar, or strip 134. The nut 132, re-threaded on the outer end of the bolt, thereby mounts the reed device from the plate 134, avoiding the necessity of any can or other case to support the device.

Although it does not show in the drawings, the various shims, the yokes, and the reed bases preferably are silver-soldered together to provide a high Q base.

Another important change in the present embodiment of the invention is to be found in the magnet structure 80a. The upstanding rim or flange 74a of the bobbin is in this instance circular and is circumferentially continuous. The outside or outer magnet pole pieces 82a are made of sheet metal, particularly low-carbon cold rolled steel. The outer pole pieces are in the main flat, but are provided with arcuate central indentations 138 which are convex toward the reeds. This allows a minimum spacing relative to the reeds, a greater spacing at the outer ends being necessary due to the size of the magnets 88a. Different sizes of indentations are used for different sizes of reeds. The indentations also position the magnets and spacers. The center pole piece 90a and the outer or outside pole pieces 82a form with the cylindrical magnets 88a and the brass spacers 96a a snug fit within the cylindrical upstanding wall or flange 74a, and epoxy cement indicated at 140 is placed within the wall and adjacent the parts just enumerated positively to mount the parts in position without the necessity of mechanical fastening means, and without the necessity of any recesses in the outside pole pieces for positioning the magnets, or the necessity of any rivets for holding the spacers in position.

A further modification of the invention is shown in FIGS. 13 and 14, incorporating the construction of the embodiment of FIGS. 8–12, but adapted for enclosure in a can, and thereby having certain of the constructional features of FIGS. 1–7. The parts are similar in most respects to those heretofore shown and described, and hence like numbers are used with the addition of the suffix b. The embodiment is the same as that in FIGS. 8–12, except that a mounting pin 42b is mounted at the bottom center between the shims 38b, and the bolt 60b is terminated immediately adjacent the nut 132b. Except for the shortening of the bolt 60b, the yokes, the shims, the reeds, and the mounting pin are clamped together in the same way as the embodiment of FIGS. 8–12, preferably with the addition of silver solder, but omitting the mounting plate, and also omitting any nut equivalent to the brass nut 130. The depending tongue 48b of the mounting pin is soldered within an inverted counter-sunk bushing 108b as in the embodiment of FIGS. 1–7, mounting pins 114b having their upper ends 116b turned in to the circumferential recess 100b in the mounting insulator 98b, all substantially as in the embodiment of FIGS. 1–7.

Another embodiment of the invention is shown in FIGS. 15–17. This embodiment is substantially identical with the embodiment of FIGS. 8–12 as modified in FIGS. 13 and 14, similar parts being identified by the use of similar numerals with the addition of the suffix c. An essential variation in the present embodiment of the invention is the incorporation of electric contacts 142 in spaced, confronting relation at the outer ends of the reed tongues 36c. These contacts are of any suitable contact material, silver being a preferred example, and the contacts are brought into engagement upon vibration of the reeds. Since the reeds are to establish an electrical circuit, they are necessarily insulated from one another, and to this end there are mica spacers or shims 144 on the inner faces of the reeds and abutting the reed mounting pin 42c. There are conductive, preferably brass, shims 124c on the outside of the reed bases, and these are provided at opposite lower corners with extending tabs 146 for receipt of lead wires 148 which are soldered to the tabs, and which preferably may be also wrapped around the tabs. Mica spacers 150 also lie against the outer faces of the brass shims or spacers 42c, and the stack is completed by outer brass spacers or shims 152 for strength and rigidity. Insulating washers 154 such as of mica abut the brass outer shims or plates 152 and respectively are engaged by the bolt head 62c and the nut 132c. Preferably an insulating sleeve 156 encircles the bolt shank to prevent shorting out with the reed bases.

Instead of relying on the change of inductance, in the present embodiment of the invention an actual physical, electric contact is made between the reeds upon vibration thereof.

A novel and practical circuit embodying the resonant reed device substantially as heretofore shown and described is shown in FIG. 18. In this figure the reeds are shown at 30, and the coil 70 is a split coil, comprising an input winding 70x and an output winding 70y in inductive relation thereto, the coils being wound one on top of another in accordance with conventional practice. Dots are used to indicate the polarity of the windings, and it will be seen that when the voltage across the input winding 70x is momentarily positive at the top, the voltage across the secondary or output winding 70y is positive at the bottom.

The bottom of the primary or input winding 70x is connected to the top of the primary or input winding 158 of a transformer 160, the winding 158 being in inductive relation with a secondary or output winding 162. The transformer 160 is substantially identical in construction with the winding 70, comprising windings identical to the windings 70x and 70y wound on a spool or bobbin in the manner heretofore disclosed. The only difference is that instead of two vibratory reeds there are two sections of steel 164. For matching purposes the steel 164 is magnetically identical with the steel of the reeds 30, and preferably the core or steel 164 comprises a strip of the reed steel having twice as much steel in it as one reed, and folded into a U or hairpin shape and inserted into the coil windings. It will be observed that the reed winding 70 and the transformer 160 are arranged in a third circuit about which more will be described later, having an output at 166. The U-shaped or hairpin-shaped strip 164 is inserted into the transformer 160 until there is a null output from the bridge, and epoxy cement then is added to hold the core 164 in fixed position.

The input to the system just described, comprising a bridge identified generally by the numeral 168 is provided on lines 170 and 172, respectively going to the top of the primary winding 70x and the bottom of the primary winding 158, there being a direct connection 174 between these two primary windings. The input conductor 172 is grounded in accordance with conventional practice, and there are two diodes 176 and 178 in back-to-back parallel relation across the input. As is known, the diodes do not become fully conductive until there is about one volt across them. Hence, the input to the series connected primary windings does not go above one volt, even though the input signal may be substantially higher. This prevents overloading of subsequent stages.

The bottom end of the secondary winding 70y is directly connected by a conductor 180 to the top end of the secondary winding 162, the bottom end thereof being grounded, as shown. Dots again are used to indicate winding polarity and it will be seen that the top ends of both of the transformer windings 160 and 162 are instantaneously positive at the same time. The output of the series connected secondary windings is taken at 166 as indicated. For most frequencies the output is zero, it being observed that the two secondaries are connected in bucking relation. When an input frequency is applied to the input lines 170 and 172 which is coincident with the resonant frequency or natural period of the reeds 30, the reeds vibrate. When the reeds vibrate, the input impedance of the coil windings 70 goes up quite markedly, and empirically has been found to go up by a factor of about three. This not only increases the voltage across the output winding 70y, causing unbalance of the bridge, but simultaneously decreases the primary current through the series connected primary windings 70x and 158. Since the current through the primary winding 158 is decreased, the output voltage of the secondary winding 162 is decreased. Thus, there is a double unbalancing of the bridge, due to the increase in voltage across the secondary winding 70y and the decrease in voltage across the winding 162. Hence, there is a substantial ouptut signal at 166. This output signal may be a sine wave, but more typically is inclined to be a modified square wave, since the diodes 166, 178 clip the input wave if it is greater than about one volt.

The output at 166 is connected to a transistor amplifier and rectifier circuit as now will be described. The output point or connection 166 is coupled by a capacitor 182 to the base of an n-p-n transistor 184. The base is biased by a voltage divider comprising series connected resistors 186 and 188, the junction of the two being connected to the base of the transistor 184, with the bottom end of the resistor 188 grounded and the top end of the resistor 186 connected to a positive D.C. supply line 190, for example, of 12 v. potential. The collector of the transistor 184 is supplied with current through a resistor 192 from the supply line 190, and the emitter is grounded through the parallel combination of a resistor 194 and the capacitor 196.

The collector is connected to a power supply capacitor 198, the opposite side of which is connected to a junction 200 shunted by a diode 202 connected to ground and polarized as shown. The amplified signal from the transistor 184 is rectified by the diode 202, causing the capacitor 198 to charge positive on the side toward the collector.

The junction 200 is connected to a transistor 204, also of the n-p-n type, the base being unconnected other than to the junction 200. The emitter is directly grounded, and the collector is connected to the D.C. supply line 190 through the parallel combination of a resistor 206 and a capacitor 208. The collector further is connected to an output line 210. When the bridge 168 is unbalanced the output thereof is amplified by the transistor 184 and rectified by the diode 202, whereby the output of the transistor 204 rises from zero to approximately a positive 11 volts, thereby operating an output or control device of substantially any desired nature.

A somewhat modified circuit is shown in FIG. 19, in the nature of a Wheatstone bridge, and using resistors rather than transformers. Many of the parts are similar, and the amplifier-rectifier stages are left off, being generally similar to those shown and described in connection with FIG. 18. Thus, the input to the input lines 170 and 172 is illustrated at 212 simply as an alternator. The reed coil winding comprises a similar winding numbered 70 and proximate to the pair of reeds 30 as in any of FIGS. 1–7, 8–12, 13 or 14, the lower end being shown as grounded. The top end is connected to a junction 214 leading through a resistor 216 to the input connection 170. A second resistor 218 also is connected to the input line 170, being connected at the opposite end to a junction 220, the latter in turn being connected to a winding 158 in inductive relation to a steel core 164, preferably constructed identically with the steel core 164 previously discussed, namely comprising a hairpin- or U-shaped section of reed steel. The output is indicated at 222 and 224, respectively being connected to the junctions 214 and 220.

Normally, the bridge comprising the resistors 216, 218, reed coil 70 and inductor coil 158 is balanced for a zero output by adjusting the core 164, the core then being cemented in place as by epoxy cement. When the input from the source 212 is at the vibrational frequency of the reeds 80 the impedance of the winding 70 goes up, thereby unbalancing the bridge and providing an alternating current potential at the output terminals 222, 224. Although the circuit of FIG. 19 has the advantage of eliminating transformers, it also has a disadvantage in that it requires a differential amplifier, since neither of the output connections 222, 224 can be grounded. For this reason, the circuit of FIG. 18 is considered to be preferable.

Improved resonant reed devices have been shown herein, and novel circuits for utilizing such devices have been disclosed. The particular embodiments of the invention as shown and described will be understood as being for illustrative purposes. Various changes will no doubt occur to those skilled in the art, and will be understood as forming a part of the present invention insofar as they fall within the spirit and scope of the appended claims.

I claim:

1. A resonant reed device comprising a base, a pair of resonant reeds each supported at one end from said base and extending therefrom in spaced parallel relation to respective free ends, an energizing coil supported from said base adjacent said pair of reeds in inductive relation thereto, and permanent magnetic means supported from said base means adjacent said reed free ends, said permanent magnetic means comprising a center pole disposed between said reed free ends, a pair of outer poles each disposed opposite a reed free end relative to said center pole and a pair of permanent magnets each disposed between and in magnetic engagement with said center pole and said outer poles.

2. A resonant reed device as set forth in claim 1 and further including a pair of spacers, each spacer being disposed between and in engagement with said center pole and said outer poles, said spacers respectively being disposed opposite to said magnets, each outer poles between a magnet and a spacer having a portion extending inwardly of said respective magnet toward the adjacent reed.

3. A resonant reed device as set forth in claim 2 wherein each outer pole is of substantially uniform thickness and has a central displaced section providing said inwardly extending portion.

4. A resonant reed device as set forth in claim 2 wherein each outer pole has a recess accommodating the respective magnet whereby said portion extends in toward said reed.

5. A resonant reed device as set forth in claim 1 and further including a coil bobbin supported from said base and encircling said reeds, said coil being disposed on said bobbin and encircling said reeds, said bobbin having an axially extending wall engaging and positioning said permanent magnetic means.

6. A resonant reed device as set forth in claim 5 wherein said axially extending wall is annular and circumscribes said permanent magnetic means.

7. A resonant reed device as set forth in claim 1 and further including a coil bobbin encircling said reeds and mounting said coil about said reeds, and further including axially extending portions on said base engaging and supporting said coil bobbin from said base.

8. A resonant reed device as set forth in claim 1 wherein said base comprises a plurality of shims, a bolt extending through said shims and through said reeds, and a nut threaded on said bolt.

9. A resonant reed device as set forth in claim 1 and further including a mounting pin extending from said base in the direction opposite to said reeds, an apertured insulating base, a metallic bushing received in said apertured base oppositely of said mounting pin with said mounting pin extended into said bushing, and means for securing said mounting pin in said bushing.

10. A resonant reed relay as set forth in claim 9 wherein said insulating base has circumferentially disposed recesses therein, and further including a plate-like insulating member having a plurality of pins extending therethrough, corresponding ends of said pins lying adjacent to said insulating base and being permanently deflected into said recesses to mount said insulating base on said insulating member.

References Cited

UNITED STATES PATENTS

| | | | |
|---|---|---|---|
| 3,064,097 | 11/1962 | Osborne | 335—93 XR |
| 2,990,461 | 6/1961 | Laubien | 335—94 |
| 3,213,233 | 10/1965 | Masaki et al. | 335—94 |
| 2,356,791 | 8/1944 | Huetten | 335—101 |
| 3,218,408 | 11/1965 | Williams | 335—94 |
| 2,689,943 | 9/1954 | Rieber | 310—25 XR |
| 1,708,945 | 4/1929 | Horton | 310—25 XR |
| 2,562,640 | 7/1951 | Reason | 310—25 XR |
| 2,617,867 | 11/1952 | Welch | 310—25 XR |

MILTON O. HIRSHFIELD, Primary Examiner

B. A. REYNOLDS, Assistant Examiner

U.S. Cl. X.R.

318—130; 331—116; 335—94